United States Patent [19]

Moll et al.

[11] 4,160,787

[45] Jul. 10, 1979

[54] PROCESS FOR EXTRACTING BITTER FLAVORING PRINCIPLES FROM HOPS

[75] Inventors: Manfred Moll; Roland Flayeux, both of Vandoeuvre; Pierre Dicesare, Frouard; Bernard Gross, Villers les Nancy, all of France

[73] Assignee: G.I.E. Tepral, France

[21] Appl. No.: 672,461

[22] Filed: Mar. 31, 1976

[30] Foreign Application Priority Data

Apr. 2, 1975 [FR] France .................... 75 11278
Dec. 16, 1975 [FR] France .................... 75 39611

[51] Int. Cl.² .................. C07C 45/00; C07C 45/16; C07C 45/24
[52] U.S. Cl. ................................. 260/586 D
[58] Field of Search ......................... 260/586 D

[56] References Cited

U.S. PATENT DOCUMENTS

| | | | |
|---|---|---|---|
| 2,652,333 | 9/1953 | Nilsson | 260/586 D |
| 3,044,879 | 7/1962 | Koch et al. | 260/586 D |
| 3,354,219 | 11/1967 | Rigby | 260/586 D |
| 3,364,265 | 1/1968 | Klingel et al. | 260/586 D |
| 3,759,999 | 9/1973 | Herwig et al. | 260/586 D |
| 3,923,897 | 12/1975 | Worden | 260/586 D |
| 3,952,061 | 4/1976 | Koller et al. | 260/586 D |
| 4,002,683 | 1/1977 | Todd | 260/586 D |

OTHER PUBLICATIONS

Kuhn, "C,C-Photolytische Aromatisierung von Cyclohexadienonen des Lupulon-Typs", pp. 48–55, 66–79, (1963).

*Primary Examiner*—Norman Morgenstern
*Attorney, Agent, or Firm*—Robert E. Burns; Emmanuel J. Lobato; Bruce L. Adams

[57] ABSTRACT

A process is described for converting the $\alpha$- and $\beta$-acids of hops into the iso-$\alpha$ acids for use as a bitter flavoring principle ingredient for beers. The $\alpha$-acids content of the hops is directly isomerized to the iso-$\alpha$-acid, the bitter principle ingredient. The $\beta$ acids in the hops extract is transformed to the $\alpha$ acid either after a direct separation step before the $\alpha$-acid isomerization or the residual $\beta$-acids, after the isomerization, are then transformed and the resultant $\alpha$-acid is isomerized. The $\beta$-acid transformation results from a radiation activation followed by an oxidation step with a per-acid.

The isomerization of the $\alpha$-acid to the iso-$\alpha$-acid is accomplished by reaction with an alkaline earth metal ethoxide preferably the magnesium ethoxide.

8 Claims, 1 Drawing Figure

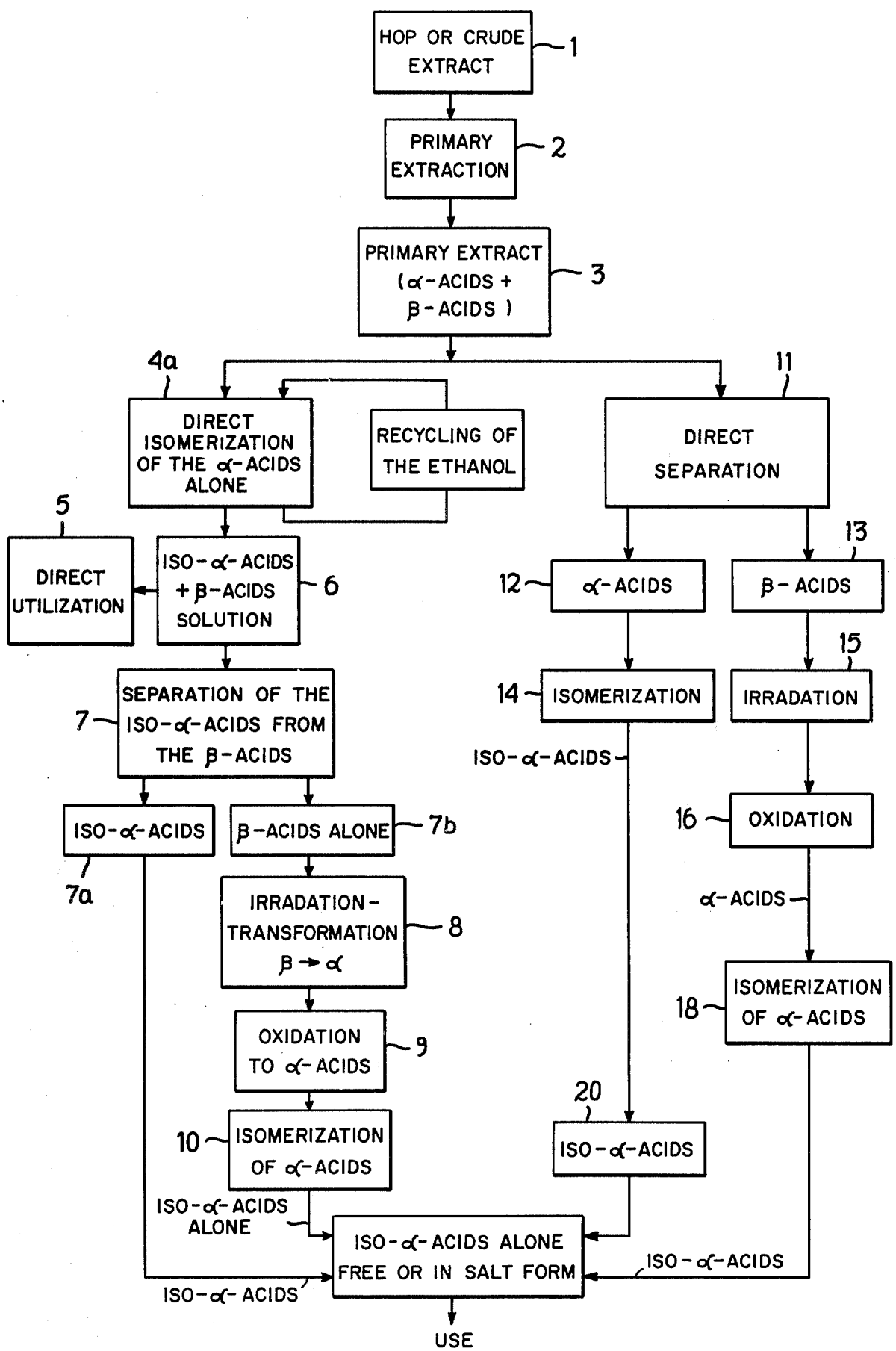

PROCESS FOR EXTRACTING BITTER FLAVORING PRINCIPLES FROM HOPS

FIELD OF THE INVENTION

The present invention relates to a process of treating a hop extract in order to prepare bitter substances intended essentially for food products, particularly for beer, more particularly it refers to the preparation of the iso-α-acids.

BACKGROUND OF THE INVENTION

Various methods of treating hops and its extracts are known. In accordance with these methods the alpha acids and beta acids are extracted from the hop by an organic solvent. For this extraction a solvent may be used, inter alia, hexane, pentane, petroleum ether, methylcyclohexane, octane, isooctane, chloroform, methylene chloride, trichlorethylene, carbon tetrachloride, ethylene chloride, benzene, toluene, xylene, acetone, methanol, ethanol, isopropanol or dibutyl ether. This extraction is effected with or without recovery of the aromatic components of the hops and of polyphenol compounds such as tannins and the like. The extraction yield with the above solvents is a mixture of at least 95% alpha acids and beta acids. The determination of the different compounds in the hops and its extracts is effected by conductimetric methods or by gas chromatography or by using an ion exchange resin.

Of course the hops and its extracts must be treated by a method which permits the maximum utilization of the characteristic bitter substances contained in the hop.

The present invention relates to a process of preparing an isomerized hop extract with maximum utilization of the normally present compounds of the hops, namely the alpha-acids such as humulone, cohumulone, adhumulone, prehumulone, and posthumulone, and the beta acids such as lupulone, colupulone, adlupulone, prelupulone, and postlupulone, to convert them to useful bittering substances fully and legally acceptable for human consumption. This extract can be added to beer in the course of manufacture, during the step of the boiling of the wort or after such boiling, during the main fermentation or toward the conclusion of the secondary fermentation.

The advantages of the invention are numerous:
 it makes it possible to reduce the non-uniformity in manufacture due to variations in quality of the starting products.
 it results in a saving due to the recycling of the treatment products (in particular the ethanol).
 it is excellently adapted to the manufacture of beer.

THE INVENTION

This invention refers to a process of treating hops for the preparation of bitter principle substances intended for food products, such as beer. A hop extract, containing a concentrate of the alpha-acids and beta-acids, is subjected to an isomerization step by reaction with the alkaline earth metal, preferably magnesium ethoxide suspended in anhydrous ethanol. This isomerization treatment is carried out either directly or after separation of the alpha-acids from the beta acids to transform the latter in order to obtain iso-alpha acids from substantially all the α- and β-acids originally present.

The invention will be more fully understood by reference to the following description, given by way of illustration and not of limitation, and to the accompanying FIG. 1 showing the different stages and solutions for obtaining the iso-alpha acids which are the desired bitter principle.

Starting from hops or a crude hop extract 1, the alpha acids and beta acids are extracted therefrom by processes 2 using an organic solvent such as hexane, pentane, petroleum ether or the like. This mixture of acids is primary extract 3.

Starting with the primary extract 3 the invention consists by the application of two treatments, to obtain, by two different methods, the same resultant product, namely iso-alpha acids. The first process involves the direct isomerization of the α-acids and the separation and transformation of the β acids to α-acids followed by further isomerization. The other process consists of the direct separation of the α-acids from the β acids, transformation of the β-acids to α acids and then isomerization of the combined α acids.

In accordance with a first method, the primary extract 3 is subjected to a direct isomerization step 4 by the use of an alkaline earth metal ethoxide, preferably magnesium ethoxide.

The magnesium ethoxide is obtained by reacting anhydrous ethyl alcohol with pure magnesium. The ethoxide transforms only the alpha-acids into iso-alpha-acids, without modifying the beta-acids.

One can thus proceed in accordance with the following scheme.

The primary extract 3 is dissolved in anhydrous ethanol. To this solution of alpha-acids there is added slightly more than twice the stoichiometric amount of α acids of the magnesium ethoxide suspended in ethyl alcohol to isomerize the α-acids. The isomerization operation 4 is carried out under an inert preferably nitrogen atmosphere and the mixture composed of the solution of α-acids and magnesium ethoxide, suspended in ethyl alcohol, is refluxed, while avoiding oxidation. At atmospheric pressure, the temperature in the solution is about 80° C., for example 78° C.

The mixture of isomerized α acids and the unreacted β-acids 6 from the first procedure can be directly utilized as a bitter flavoring 5 or the mixture 6 after isomerization can be separated by a separation procedure 7 into iso-α-acid 7a and β-acid 7b. The β-acids are activated for transformation by an irradiation step 8 and then the activated beta-acids are oxidized by peracids in step 9 to alpha-acids. The resultant alpha-acids from step 9 are then isomerized by the magnesium ethoxide procedure utilized in step 4 to the iso-alpha-acids.

According to the second procedure the primary extract 3 of alpha-and-beta acids is subjected to a direct separation step 11 to yield a separate alpha acid fraction 12 and a separate beta acid fraction 13.

The alpha-acid fraction 12 is then subjected to the alkaline earth metal ethoxide isomerization 14 to yield the iso-alpha-acids or salts 20 which are the useable products of this invention. The beta-acids 13 are activated by an irradiation step 15 and then oxidized by per-acids 16 to yield alpha-acids 17 which are then isomerized 18 via alkaline earth ethoxide to iso-alpha-acids 19 which are combined with the iso-alpha-acids 20 from the isomerization of the original alpha-acids 12.

The isomerization of alpha-acids from hops to the iso-alpha-acids bitter principles according to this invention is performed in anhydrous ethanol by an alkaline earth ethoxide, preferably the magnesium ethoxide.

The magnesium ethoxide is prepared by reacting pure magnesium metal with anhydrous ethanol. The presence of water is to be avoided as magnesium hydroxide, which would form, impedes the reaction of the alcohol with the magnesium. The reaction of the ethanol with magnesium is initiated by warming the mixture, then additional alcohol and magnesium may be added to the refluxing mixture once the reaction has started.

The other alkaline earth metals may be substituted for the magnesium. The ethoxide is recovered and used as a suspension in ethanol.

The isomerization reaction to convert the alpha-acids of hops to the iso-alpha-acid form is carried out at reflux temperatures at about normal pressure. At least twice the stoichiometric amount of magnesium ethoxide to alpha-acid is preferred. Under such conditions at least 85 and generally 90 to 95% of the alpha-acids are isomerized.

It has been noted that the isomerization reaction with the alkaline earth ethoxide has no effect at all on any beta-acids which may be present in the starting extract. However, the isomerization reaction, as mentioned above, may be carried out on either a mixture of the unseparated alpha- and beta-acids or upon the alpha-acids obtained after a separation step.

It has been found that in order to obtain an optimum yield of iso-alpha acids, the amount of magnesium ethoxide must be slightly more than twice the stoichiometric amount of alpha-acids. The concentration of alpha-acids in the reaction solution is important. Below a concentration of $4 \times 10^{-2}$ mols/liter, the yields of iso alpha acid drop rapidly as shown in Table I.

TABLE 1

| Concentration of alpha acids (mols/liter) | Concentration of magnesium ethoxide (mols/liter) | Time of heating (minutes) | % isomerization |
|---|---|---|---|
| $5 \times 10^{-2}$ | $5 \times 10^{-2}$ | 30 | 30 |
| $5 \times 10^{-2}$ | $11 \times 10^{-2}$ | 15 | 95 |
| $5 \times 10^{-2}$ | $22 \times 10^{-2}$ | 15 | >85 |
| $1 \times 10^{-2}$ | $2.2 \times 10^{-2}$ | 20 | 60 |
| $2 \times 10^{-2}$ | $4.4 \times 10^{-2}$ | 20 | 80 |
| $4 \times 10^{-2}$ | $8.8 \times 10^{-2}$ | 15 | 95 |
| $1 \times 10^{-1}$ | $2.2 \times 10^{-1}$ | 10 | >95 |
| $4 \times 10^{-1}$ | $8.8 \times 10^{-1}$ | 10 | >95 |
| $5 \times 10^{-1}$ | $11 \times 10^{-1}$ | 10 | ~100 |

Upon completion of the isomerization, the solution is cooled to room temperature. It contains the iso-alpha acids in the form of their magnesium salts and beta-acids. The ethanol is distilled and recycled.

The magnesium salts of the iso alpha-acids may be used directly after the evaporation of the ethanol in countries which permit the addition of metal ions to beers; or the magnesium or other alkaline earth salts may be the object of additional treatments to break up the salts to that the sole resultant bitter flavor product is essentially pure iso-alpha-acids.

As mentioned above, the isomerization of the alpha-acids by the magnesium ethoxide suspended in ethanol can be carried out either on pure alpha-acids such as humulone or on the alpha-acids mixed with beta-acids. The resultant solution of the iso-alpha-acids after isomerization may be used directly as a bittering principle by addition, before or after boiling of the wort and either before, during or after either the primary or secondary fermentations as desired by the brewmaster.

However, as certain countries permit only the addition of natural principles or extracts to beers, the direct addition of the magnesium salts of the iso-alpha-acids is forbidden. To meet such requirements, the magnesium salts are converted to the free acids and the magnesium ions are removed. This is readily performed by passing the ethanolic solution of the magnesium salt of the iso alpha acid through a suitable strong, ion-exchanger in the acidic phase. The effluent from such an ion exchanger bed or column is the free iso-alpha-acid.

The separation of the alpha- or the iso-alpha acids from the beta-acids by the novel solvent partition method is carried out in an apparatus known as a pulsed column, consisting of a vertical tubular central portion which is provided with uniformly spaced, stationary, perforated, horizontal trays and with two flared, cylindrical ends which are without trays and of small height.

The column has a heavy-phase inlet at the upper part and a heavy-phase outlet at the lower part as well as a light-phase inlet at the lower part and a light-phase outlet at the upper part.

The operation of this apparatus consists in causing the two fluids in liquid phase to flow countercurrent under the action of their difference in densities. A pulsing mechanism assures a reciprocating contact of the total liquids contained in the column. This movement provides and maintains a homogeneous mixture of the two phases throughout the entire central portion or contact zone. Regulating the feed rates and the pulsing permits the regulating of the interphase and makes it possible to maintain the latter in such a position that each of the liquid phases of different density emerges entirely clear.

The use of this pulsed column as separator for the separating of the alpha-acids or iso-alpha acids from the beta acids makes it possible to obtain substantially complete separation thus leading to satisfactory results.

The separation treatment by this interphase contact comprises the following operations: evaporation of the ethanol from the mixtures of iso alpha-acids and beta-acids to obtain a dry residue of the acids, treatment of the residue with an organic solvent of the hexane type at room temperature after acidification of the residue with a strong acid such as hydrochloric acid in order to free the magnesium.

The separation proper, is carried out counter-current in the pulsed column between the resultant organic phase and an aqueous phase consisting of a solution of salts, for example sodium and potassium salts. Control of the separation is achieved by the variable relative proportions of liquids, their rates of flow, and the concentrations of the hops acids and salts in the liquids.

The operation is preferably carried out in the dark, under an inert gas and at a temperature slightly above room temperature. The components during separation are light-sensitive. The beta-acids are transformed into alpha-acids by means of two successive stages of treatment.

The first step consists in ultra-violet irradiation at a wavelength of 3500 to 3600 Angstroms. The beta-acids recovered either before or after isomerization of the alpha-acids are dissolved in ethyl alcohol or methyl alcohol and are irradiated for a length of time which is variable with the concentration of beta acids and as an inverse function of the power of the lamps employed. During the radiation, the temperature is kept between 10° C. and 50° C. The radiation-activation products obtained are deoxyhumulones, the term humulone being a general term employed herein for designating alpha acids. The yield of deoxyhumulones in the transformation is from 60% to 75% of the beta-acids used. This is in essence an activation of the beta-acids for the next step.

The second step comprises the oxidation of the deoxyhumulones or activated beta-acids. The oxidation which is carried out in a basic, aqueous, medium at a pH of 10 to 12 buffered by dissolving trisodium, disodium phosphates or other buffers in water. The oxidation is effected by means of a peracid such as monopersulphuric acid, para-nitro perbenzoic acid or peracetic acid at a temperature below 25° C. The yield of alpha-acids is at least 60% based on deoxyhumulones or at least 35 to 50% of the total beta-acids. The alpha-acids obtained are isomerized under the conditions described above, utilizing magnesium ethoxide.

DETAILS OF THE INVENTION

The invention will be further described in the appended examples. These examples demonstrate the variations of the process and its adaptability to meet variables in raw materials or varying final product requirements. All art-recognized equivalent materials and conditions are intended as within the scope of this exemplary material.

EXAMPLE 1

Preparation of the Magnesium Ethoxides

The magnesium ethoxide is prepared by reacting anhydrous ethanol with pure magnesium. The mixture of ethanol and magnesium is heated to the boiling point. When the attack of the magnesium has started, additional anhydrous ethanol is slowly added. The refluxing is continued for an entire day. The magnesium ethoxide is recovered suspended in ethanol. Larger quantities can be obtained by adding additional portions of magnesium and alcohol to the reactor as soon as the reaction has been initiated.

EXAMPLE 2

Isomerization of Humulone (Alpha-Acid) and Preparation of Magnesium Salt of Iso-Alpha-Acid A mixture of humulone, magnesium ethoxide, in slightly more than two times the stoichiometric amount of alpha-acid, and anhydrous ethanol is heated, by an oil bath, to reflux under nitrogen. The reaction mix is shielded from light. The refluxing is continued for about 15 minutes. After refluxing, the solution is cooled. The excess ethanol is distilled off on a rotary evaporator and then recovered. The solid residue consists of the magnesium salt of iso-humulone. This salt can be used as is or may be suspended in a food polyglycol and other approved stabilizers useful for prolonged preservation. The product is non-toxic at useful levels.

EXAMPLE 3

Isomerization of 80% Alpha-Acids 2.25 g of a mixture of 80% alpha acids, in a concentration of about $0.10^{-1}$ mols/liter and 1.25 g of magnesium ethoxide, as prepared as in Example 1, in 50 ml of anhydrous ethanol are placed in a 100 ml two-neck round bottom flask provided with a condenser and a nitrogen inlet. The briskly agitated mixture is heated under reflux by an oil bath at 110° C. The batch is maintained shielded from light and under a nitrogen atmosphere. The refluxing is continued for 15 minutes.

After cooling, the ethanol is distilled under vacuum. The gummy residue is acidified with 20 ml of a one N HCl and dissolved with two portions of 30 ml of ether. The ethereal phase is dried over magnesium sulfate and then evaporated under vacuum. 2.10 g remain of an oily product, which by gas chromatography consists of the magnesium salt of iso-alpha-acid in a yield of 90 to 95%.

EXAMPLE 4

Preparation of Iso Alpha-Acid

The ethanolic solution from Example 3 of the isomerized magnesium salt of the iso-alpha-acid is converted to the iso-alpha-acid by contacting this solution with a strong ion exchange resin in the acid phase. The magnesium ions are adsorbed on the resin and the ethanolic effluent contains the iso-alpha-acid free from magnesium. The ethanol may be distilled and recovered for recycling to the earlier stages.

After evaporation of the ethanol the residual pure iso-alpha-acids are collected with a yield of about 90 to 95% from the magnesium salts of the iso-alpha-acids.

The resulting free iso-alpha-acids are useful where the mg salts must be legally eschewed.

Examples above refer to the isomerization of pure humulone or substantially pure alpha-acids. However, as already indicated, this isomerization procedure may also apply to isomerization of alpha-acids from a primary hop extract. The extract may be isomerized directly despite the presence of the beta acids. Thus for instance, the starting extract containing 40% alpha acids and 20% beta acids gives an overall yield of iso-alpha acids of about 90% of the on alpha-acids content.

EXAMPLE 5

Isomerization of a Standard Commercial Extract Containing 39% Alpha Acids and 13% Beta Acids 2.10 g of this extract is dissolved in 60 ml of anhydrous ethanol. 0.55 g of magnesium ethoxide from Example 1 is added and the resultant mixture is refluxed under a nitrogen atmosphere for 12 minutes.

After cooling, the solution is passed over a column of acidified Dowex 50 W resin (height of 30 cm and a diameter of 12 mm.). The effluent solution is evaporated and the gum obtained in an amount of 1.85 g is analyzed by chromatography over an ion exchange resin. The isomerization is about 89% of the initial alpha-acids. The beta-acids are completely recovered. The overall loss in weight is due to the presence of an insoluble inactive vegetable debris in the commercial extract.

EXAMPLE 6

Isomerization of a Commercial Extract Containing 42% Alpha Acids

The operation of Example 5 is repeated on an extract containing 42% alpha-acids and no beta-acids. After the period of heating and passage over the ion exchange resin the extract is analyzed by gas chromatography. 96% of the initial alpha-acids are converted to the iso-alpha-acids.

The starting solution of Example 5 contains a mixture of iso-alpha-acids in the form of magnesium salts, and beta-acids. These components may be separated and then the transformation of the beta acids into iso-alpha acids is effected so as to obtain only a single resultant product, namely the iso-alpha acids or salts from both the starting alpha-and beta-acids.

This sequence is described schematically in FIG. 1 steps 11–20 including separation of the iso-alpha acids from the beta acids,
  11 transformation of the beta acids into alpha acids, 15 and 16 isomerization of the alpha acids separated or transformed 14 and 18.

EXAMPLE 7

Separation of Alpha-from Beta-Acids

Apparatus: Pulsed column of a useful height of 100 cm and a diameter of 25 mm, provided with perforated stainless steel trays spaced 50 mm apart. Diameter of the inlet holes: 0.2 cm. Transparency 24%. Mechanical pulsation.

| SOLUTION | |
|---|---|
| Aqueous phase: | 1/10 Normal |
| Organic phase: | Concentrate of the mixture of organic hops acids diluted ten times in hexane containing 0.5% beta acids 1.5% iso-alpha acids. |
| TEST | |
| In continuous aqueous phase: | |
| pulse—amplitude | = 1 cm |
| pulse—frequency | = 14 blows per minute |
| —specific flow | = 0.61 L/hr/cm$^2$ |
| —volume ratio | = $\frac{\text{organic solution}}{\text{aqueous solution}}$ = 2 |

The incoming aqueous phase is heated to 50° C. in front of the pump. Slight emulsion was initially noted in the upper settle 1 area. Qualitative analysis of the results are set forth below, the time "t" includes the time for equilibration or balancing of the column:

| Sampling at time t in minutes | Analysis by thin layer chromatography Aqueous phase | Organic phase |
|---|---|---|
| 15 | nothing | iso α + β acids |
| 60 | iso-alpha-acids | beta-acids |
| 150 | iso-alpha acids | beta-acids |

This test demonstrates the qualitatively satisfactory results when the equilibrium of the column is reached, i.e. after a stabilization of 15 minutes.

EXAMPLE 8

Separation of Iso-Alpha-Acids from Beta-Acids

Column identical to that of Example 7.

| pusle—amplitude | = 0.5 cm |
|---|---|
| pulse—frequency | = 14 blows per minute |
| —specific flow | = 0.92 L/hr/cm$^2$ |
| —volume ratio | = $\frac{\text{organic solution}}{\text{aqueous solution}}$ = 2 |

The organic solution of hexane used for the tests contained
0.44% beta-acids
1.15% iso-alpha acids.

Analytical results (a) Qualitative Analysis:

| organic phase | = beta-acids |
|---|---|
| aqueous phase | = iso-alpha-acids in the form of potassium salts |

(b) Quantitative Analysis:

The separation is effective at the end of 5 minutes after the balancing of the column which may take between 15 and 60 minutes.

| | | Beta Acids | | Iso-Alpha Acids | |
|---|---|---|---|---|---|
| Phase | Weight in g | Weight in g | % Recovery | Weight in g | % Recovery |
| Hexane | 1 410 | 4.9 | 80 | | |
| K$_2$CO$_3$ | 1 876 | | | 15.30 | 95 |

The iso-alpha acids are recovered in inorganic phase in the form of potassium salts and the beta acids in the organic phase.

In the Example 8 it can be noted that the recovery of iso-alpha-acids is effected in a percentage of more than 90% and that of beta-acids at 80%.

The separation of the beta-acids from alpha-acids under the above conditions in the same apparatus gave similar results.

The heavy and light phases are not necessarily the inorganic and organic phases respectively. For instance, the heavy phase may just as well be an organic solvent of the methylene chloride type.

Furthermore, the concentrations and composition of the different phases may vary. Similarly, the type of column and the test conditions may vary considerably.

The transformation of beta-acids into alpha-acids is performed by two treatment stages:

RADIATION ACTIVATION

The first stage consists of an ultraviolet irradiation at a wavelength of 3500 to 3600 Å. The beta acids separated as described in Examples 7 and 8 above are dissolved in ethanol or methanol and are irradiated for a period of time which varies with the concentration of beta-acids and as an inverse function of the power of the lamps used. During the radiation, the temperature is maintained between 10° C. and 50° C. The products of the radiation are desoxyhumulones, the term humulone being the generic expression used to designate the alpha acids listed above. The yield of the radiation transformation is 60% to 75% desoxyhumulones. Thus the beta-acid are activated for the next stage.

EXAMPLE 9

Irradiation of Colupulone at 3500 Å

220 mg of pure colupulone (a beta-acid) are dissolved in 300 ml of anhydrous ethanol. The solution thus obtained is deoxidized by a stream of nitrogen passed through the solution for a few minutes. The irradiation is effected in an apparatus of the Rayonet RPR 100 type with the solution in pyrex tubes.

The transformation is checked by thin-layer chromatography. After 5 hours the transformation is complete. The solution is then evaporated and the resultant mixture is analyzed; it contains 150 mg of desoxycohumulone.

EXAMPLE 10

Irradiation of Commercial Hops Extracts Containing Only Beta Acids 1.22 g of base extract containing 18% beta-acids; about 220 mg of beta acids, are dissolved in 300 ml of anhydrous ethanol. The solution thus obtained is treated, after deoxidation, in the apparatus of Example 9 under the same conditions. The extract obtained after evaporation of the alcohol analyzed by gas chromatography after silylation contains 13% desoxy alpha-acids. This is a yield of about 75%.

EXAMPLE 11

The same operations as in Example 9 is carried out with different commercial hops extracts so as to obtain solutions containing about 200 mg of beta-acids in 300 ml of ethanol. In each case the rate of transformation was about 75%.

OXIDATION

The second stage of the conversion of the activated beta-acid to alpha-acids is then carried out, namely the oxidation of the desoxy-alpha-acids. The oxidation is carried out in an aqueous medium buffered at a pH of 10 to 12 by means of a trisodium phosphate, disodium phosphate or other buffers. The oxidation is effected by means of a per-acid such as mono-persulfuric acid (Caro acid), p-nitro perbenzoic acid or peracetic acid at a low temperature i.e. less than 25° C. The yield of alpha-acids is at least 60%.

The isomerization, of the resultant alpha-acid product is then effected under the conditions described in Examples 1–4 to obtain iso-alpha acids in the form of magnesium salts which can be used directly or after liberating of the magnesium. The following transformation of pure colupulone describes this procedure and has also been applied successfully to beta-acids generally.

EXAMPLE 12

Conversion of Colupulone to Alpha-Acid

Pure colupulone obtained either by synthesis or from hop extract first mixed with a solvent and then purified by separation over a silica column is used. Pure colupulone is dissolved in anhydrous ethanol. The solution is deoxidized by bubbling nitrogen through it. It is then irradiated by means of a radiation apparatus equipped with lamps of an average total power of 500 watts, with maximum emission which is at about 3600 Å. After total transformation (4 1/2 hr) a yield of 75% of desoxycohumulone is obtained.

The solution is evaporated and the gum recovered is dissolved in a 1M pH 11.5. trisodium phosphate/disodium phosphate buffer solution of a 1:1 ratio. The oxidation is effected with cooling to below 10° C., under nitrogen by the slow addition of p-nitro perbenzoic acid. The oxidation is complete after about one hour. The solution is then acidified by hydrochloric acid and extracted with hexane. After evaporation of the hexane, an oily product containing humulone (alpha-acid) is recovered. The yield of alpha-acid thus obtained is greater than 60%. Thus more than 45% of the initial beta-acids are converted. The product obtained was isomerized by the magnesium ethoxide method of Examples 1–3.

EXAMPLE 13

Oxidation of Desoxycohumulone by p-Nitro Perbenzoic Acid 150 mg of desoxycohumulone obtained by ultraviolet irradiation of colupulone are dissolved in a minimum amount of alcohol. This solution is added to 50 ml of disodium/trisodium phosphate buffer of a pH of 10.5.

The mixture is stirred and kept at room temperature (20° C.) under a nitrogen atmosphere. 120 mg of p-nitro perbenzoic acid are then slowly added during the course of 30 minutes. After two hours the mixture is acidified with a solution of 1 N hydrochloric acid to a pH of less than 3 and extracted with three portions of 50 ml of hexane. After drying over magnesium sulfate, the hexane phase is evaporated and the gum obtained analyzed. Gas chromatography indicates that the desoxycohumulone has been converted into cohumulone with a yield of 58%.

EXAMPLE 14

Oxidation by Caro's Acid 11 g of pure sulfuric acid are mixed with 10 g of potassium persulfate. After 10 minutes, 30 g of sodium sulfate are added to the preceding mixture. After 24 hours the solidified mixture is reduced to powder form and the mono-persulfuric acid is determined by iodometry. It contains about 7% per-acid. The oxidation of 150 mg of desoxycohumulone is carried out as in Example 13 with the paranitroperbenzoic acid being replaced by 1 g of Caro's acid. The yield of alpha-acids is 56%.

EXAMPLE 15

Oxidation by "Caroat" (Degussa product)

The "Caroat" is previously determined by iodometry. It contains about 6% per-acids. The oxidation of 140 mg of desoxycohumulone is carried out as in Example 13 using 1 g of "Caroat" as the oxidant.

The yield of a alpha-acids is 55%.

The same succession of operations is applied upon the direct separation of the alpha-acids and beta-acids from the primary extract. This sequence is also included within the ambit of the invention.

The direct separation is effected in a pulsating column in accordance with conditions similar to those indicated in Examples 7 and 8.

The alpha-acids and beta-acids after separation are obtained in solution and treated respectively by isomerization with magnesium ethoxide and thus transformed into iso-alpha acids.

The processes for separation, transformation, oxidation and isomerization indicated above have been described in detail; however, it is understood that various simple changes are possible while remaining within the scope of the invention.

The final solution is then cooled to room temperature; it contains iso-alpha acids in the form of magnesium salts.

The solution may be used directly after evaporation of the ethanol in countries in which the laws permit this or it may be additionally treated so that only iso-alpha acids are present as resultant product.

Thus the isomerization of alpha acids by means of magnesium ethoxide suspended in ethanol can be carried out in two different manners and proven first on pure humulone, has been extended successfully to all alpha acids, and as indicated on alpha-acids prepared by conversion from beta-acids.

What is claimed is:

1. A process of treating hops for the preparation of bitter flavoring extracts for food products and fermented beverages which comprises the steps of
    (a) subjecting a purified hop extract containing alpha and beta-acids to a direct isomerization treatment of the alpha-acids by mixture thereof with magnesium ethoxide suspended in anhydrous ethanol, said mixture being shielded from light and refluxed under nitrogen,, with agitation, at a temperature of the order of 80° C. and atmospheric pressure to form isoalpha-acids;

(b) effecting a separation of the iso-alpha acids from the beta-acids in a pulsed column wherein the isomerized alpha-acids and the beta-acids are intermixed in an organic liquid phase containing the acids and are contacted in a pulsed column with an inorganic aqueous liquid phase comprising alkali metal carbonates or phosphates in solution, said pulsed column effecting the separation by internal dispersion of the two phases, the iso-alpha acids transferring into the aqueous liquid phase and the beta acids remaining in the organic liquid phase;

(c) isolating the resultant iso-alpha acids;

(d) transforming the separated beta-acids into alpha-acids by ultraviolet radiation at 3500–3600 Å, at a temperature between 10° and 50° C. to form a desoxy-alpha-acid and then oxidation of said desoxy-alpha-acid by a per-acid in a basic medium at a pH of 10–12, at a temperature of less than 25° C., said per-acid being selected from the group consisting of mono-persulfuric acid, p-nitro-perbenzoic acid and peracetic acid;;

(e) then treating the alpha acid from (d) in another magnesium ethoxide isomerization (as in a) to obtain iso-alpha acids in free form in the form of the magnesium salt of said iso-alpha-acids.

2. The process according to claim 1, wherein
said extracts containing alpha acids and beta acids at a) are dissolved in anhydrous ethanol, reacted with magnesium ethoxide in an amount exceeding twice the stoichiometric, amount based on the alpha acids;

refluxing the resultant mixture under a nitrogen atmosphere;

after cooling the ethanolic solution, passing it through a strongly acid ion exchanger resin column;

evaporating the effluent from said column to yield iso-alpha-acids and beta-acids.

3. The process according to claim 1, wherein said pulsed column is provided with spaced-apart, perforated corrosion-resistant trays and is protected from light.

4. The process according to claim 1 wherein the alpha acid formed at (d) is then subjected to an isomerization by means of the ethoxide of magnesium.

5. The process according to claim 1, step (d) wherein the desoxy-alpha-acid, obtained after the ultraviolet irradiation is dissolved in alcohol, buffered with disodium/trisodium phosphate buffer to a pH of 10.5; slowly mixed with a slight excess of paranitroperbenzoic acid and, after completion of the reaction therewith, is acidified to free the alpha acid.

6. A method of processing hops for the preparation of bitter substances wherein an extract of hops, containing mainly alpha-acids and beta-acids is subjected to an isomerization process by forming a mixture thereof with magnesium ethoxide suspended in anhydrous ethyl alcohol and refluxing the mixture under an inert atmosphere while said mixture is shielded from light in order to form the magnesium salt of iso-alpha-acids from the alpha acids.

7. The process according to claim 6 wherein said isomerization process is effected either directly on said extract or after separation of the alpha-acids and beta-acids of said extract.

8. A method as in claim 6, wherein after isomerization, the ethyl alcohol solution of the magnesium salts formed is contacted with an acid ion-exchange resin to remove the magnesium ions and the resultant magnesium-ion free solution, after evaporation of the ethyl alcohol, leaves a residue of pure iso-alpha-acids.

* * * * *